United States Patent [19]

Bernstein

[11] 4,069,766
[45] Jan. 24, 1978

[54] FUEL TRANSFER MACHINE

[75] Inventor: Irving Bernstein, West Hartford, Conn.

[73] Assignee: Combustion Engineering, Inc., Windsor, Conn.

[21] Appl. No.: 636,347

[22] Filed: Nov. 28, 1975

[51] Int. Cl.² .............................................. B61B 9/00
[52] U.S. Cl. ................................ 104/173 R; 176/30; 214/18 N
[58] Field of Search .............. 104/138 R, 147 R, 162, 104/165, 173, 176, 178; 254/147; 214/18 N, 16.4 A, 730; 176/30, 31, 32; 74/89, 110

[56] References Cited
U.S. PATENT DOCUMENTS

| B 373,344 | 2/1976 | Katz et al. | 214/18 N |
|---|---|---|---|
| 3,010,328 | 11/1961 | Forey | 74/110 |
| 3,260,384 | 7/1966 | Lemesle et al. | 214/18 N |
| 3,637,096 | 12/1972 | Crate | 214/18 N |

FOREIGN PATENT DOCUMENTS

| 1,295,478 | 5/1969 | Germany | 214/16.4 A |
|---|---|---|---|
| 1,590,198 | 5/1970 | Germany | 254/147 |
| 485,782 | 5/1938 | United Kingdom | 104/173 |

*Primary Examiner*—Robert J. Spar
*Assistant Examiner*—Randolph A. Reese

[57] ABSTRACT

A nuclear fuel transfer machine for transferring fuel assemblies through the fuel transfer tube of a nuclear power generating plant containment structure. A conventional reversible drive cable is attached to the fuel transfer carriage to drive it horizontally through the tube. A shuttle carrying a sheave at each end is arranged in parallel with the carriage to also travel into the tube. The cable cooperating with the sheaves permit driving a relatively short fuel transfer carriage a large distance without manually installing sheaves or drive apparatus in the tunnel.

8 Claims, 3 Drawing Figures

FUEL TRANSFER MACHINE

BACKGROUND OF THE INVENTION

This invention relates to the transfer of nuclear fuel assemblies and in particular to a method and apparatus for transferring fuel bundles from the nuclear reactor pool inside the containment building to the spent fuel storage pool external to the containment building.

In refueling a nuclear reactor, the radioactive fuel bundles must be removed from the reactor core and stored for an extended period of time in a spent fuel pool. In order to avoid the hazards due to radiation, the nuclear reactor core is flooded with water to a substantial depth above the top of the core with the fuel elements removed under water. Since these fuel elements are highly radioactive and still produce heat, known as decay heat, for a period of several months, they cannot be immediately removed from the plant but must be stored preferably under water which provides radiation protection and the necessary cooling.

When radioactive isotopes of these spent fuel elements have decayed sufficiently, they may be removed and shipped for reprocessing. Since the nuclear reactor will be back in operation at this time, it is preferable that the spent pool be located outside of the reactor containment building. Since the reactor containment building is designed to withstand relatively high pressures and to provide radiation shielding, large openings in its walls are cumbersome and expensive. The elongated fuel elements are therefore longitudinally passed through openings in the reactor containment.

Accordingly, the spent fuel pool is generally located adjacent to the reactor pool but outside of the containment building. A transfer tube capable of being closed by means of gate valves, and/or blind flanges joins the two pools. Transfer of fuel between the two pools requires that the fuel be placed into a fuel carrier mounted on a fuel transfer carriage. The fuel carrier is rotated to a horizontal position and the fuel carriage with fuel carrier and fuel assembly is translated through the horizontal tube into the spent fuel storage pool. The fuel carrier and fuel assembly is then returned to the vertical position, and the fuel assembly is lifted out of the fuel carrier and placed in storage racks within the spent fuel pool.

If a relatively short transfer tube is used to connect the two pools, a transfer system can be used which is driven in either direction by a single device located near either pool. When the length of the transfer tube is substantially lengthened, the requirements for the size of the pool on the driven end become inordinately large due to the requirement that the carriage be of increased length. It, therefore, becomes infeasible to drive the transfer system from one side so that two drives are required. An alternative to the two drive approach is the installation of additional equipment in or through the tunnel in preparing to transfer fuel. This equipment can not be left in place since the fuel transfer tube must be closed during normal operation of the reactor.

SUMMARY OF THE INVENTION

The invention provides a shuttle and a fuel transfer carriage, both of which operate on tracks passing through the transfer tube. The shuttle carries sheaves on its opposite ends. A drive cable passes over each of these sheaves and then is attached to the near end of the fuel transfer carriage. When the cable is operated in such a manner as to move the fuel transfer carriage from one pool into the adjacent pool, it also operates to move the shuttle toward the adjacent pool. The shuttle is driven until the near side sheave of the shuttle is adjacent to the near side entrance to the tube. This movement of the shuttle inserts the shuttle a substantial distance into the transfer tube. The fuel transfer carriage on another track can, therefore, be driven from the sheave on the far side of the shuttle which is now located well within the fuel transfer tube.

With this arrangement, no equipment need remain passing through the fuel transfer tube during normal operation of the reactor. This arrangement also eliminates the need to manually insert sheaves or transfer cables through the tube in preparation for fuel transfer operations. The entire shuttle arrangement permits the existing system to operate in such a manner as to permit complete movement of the fuel transfer carriage through the fuel transfer tube even though the length of the carriage may be quite short. Thus is avoided the requirement of making large pools for the sole purpose of accepting long fuel transfer carriages where horizontal translation of the fuel assemblies is required.

Additional shuttles may be supplied which operate in the same manner and achieve an even greater extension of the drive.

A latching mechanism interacting between the fuel transfer carriage and the shuttle normally operates to withdraw the shuttle when the fuel transfer carriage is withdrawn. However, when extensive fuel transfer operations are being carried out, this latching mechanism may be disconnected and the shuttle may be locked in its extended position in the tube whereby the sheave permitting the extensive movement of the fuel transfer carriage is maintained at its extended position without manual insertion of equipment.

DESCRIPTION OF THE PREFERRED EMBODIMENT

Figure 1:
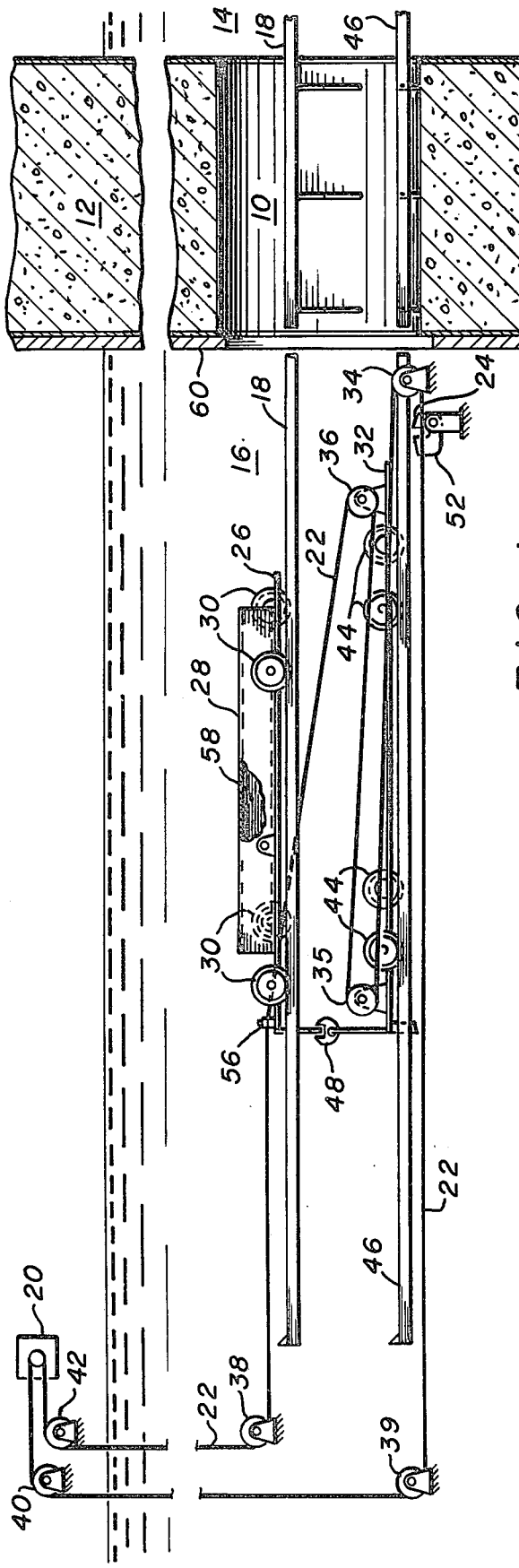
FIG. 1 illustrates the fuel transfer carriage and a shuttle in the withdrawn position.
Figure 3:
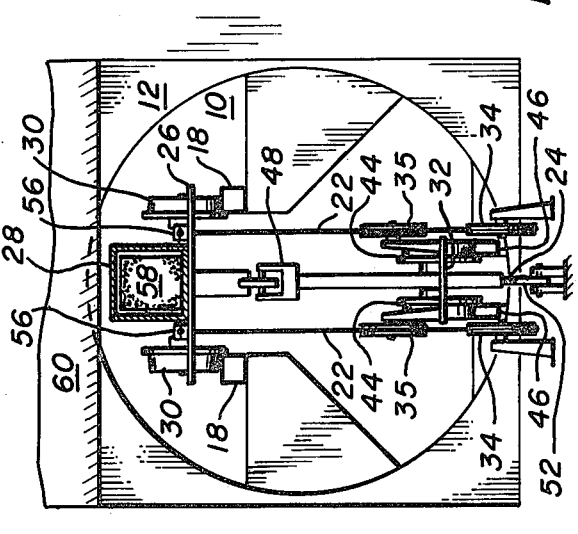
FIG. 3 illustrates the same apparatus as viewed from an end position through the fuel transfer tube.
Figure 2:
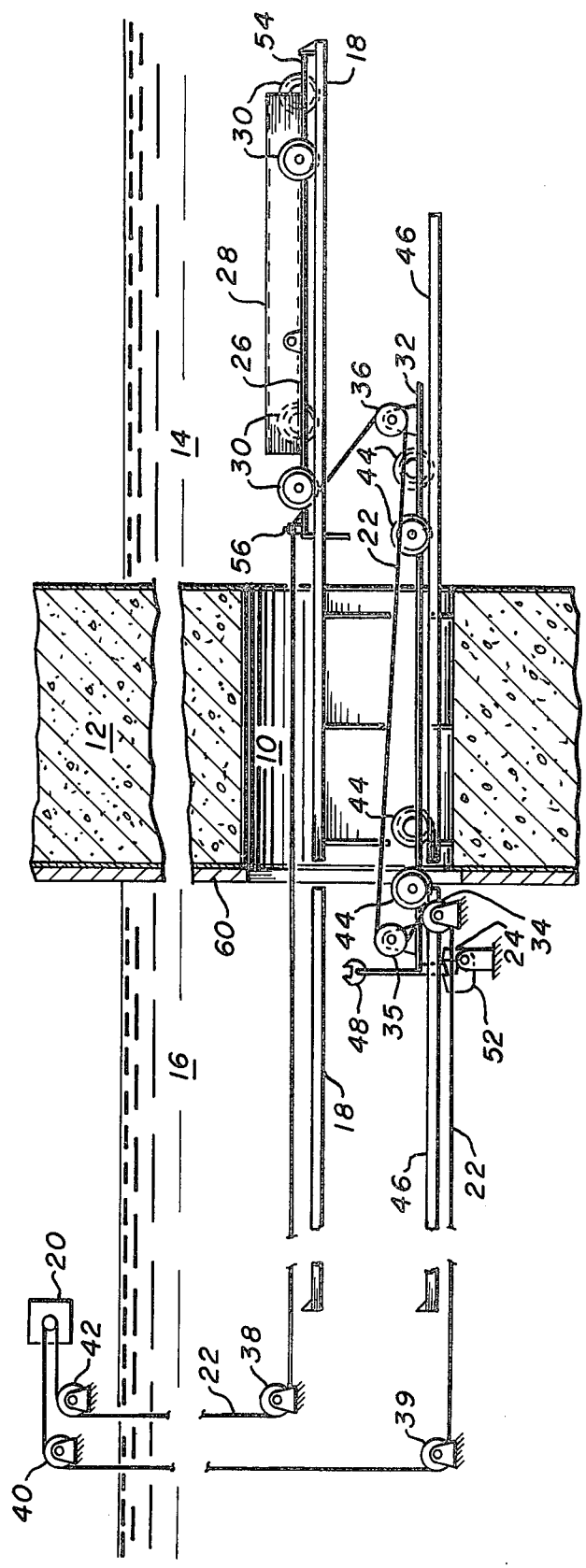
FIG. 2 illustrates the same apparatus in the extended position.

A fuel transfer tube 10 passes through reactor containment structure 12 connecting the reactor pool 14 and the spent fuel pool 16. This tube 10 has a gate valve 60 located at one side and a blind flange located on the reactor side during normal reactor operation. The overall length of the fuel transfer tube 10 and the associated valve 60 is about seventeen feet. For the purposes of generality, the reactor containment building may be considered to be a barrier to be passed having near and far sides.

A plurality of pairs of tracks 17, 18 and 46 pass from the reactor pool 14, through the transfer tube 10 to the spent fuel pool 16. The tracks 17, 18 and 46 have small discontinuities therein to permit closure of the gate valve 60 and installation of the blind flange. The tracks 46, 18 extend about twenty feet into the reactor pool 14 and also extend from the outer edge of valve 60 about eighteen feet to stop 54 located on the tracks 18. A motor operated drive 20 is operable to drive a drive cable 22 selectively in either direction. This drive is located in the building housing the reactor pool 14 at an elevation above the operating water level of the reactor pool during fuel transfer operations. With the arrangement illustrated, the reactor pool side of the apparatus is designated as the near side while the spent fuel pool side is thereby designated as the far side. It should be recognized that the arrangement could be reversed so that the drive is located in the spent fuel pool 16.

A fuel transfer carriage 26 is mounted on wheels 30 and is horizontally translatable along tracks 18 for carrying fuel bundles 58. A fuel bundle carrier 28 is rotatably mounted on the carriage 26. This carrier 28 is rotated to the upright position for the purpose of receiving and discharging fuel assemblies 58 while it is rotated to the illustrated horizontal position for the purpose of transferring the fuel assemblies 58 through the tunnel 10 from one pool to the other. This fuel transfer carriage 26 is about eighteen feet long.

A shuttle 32 is also horizontally translatable on wheels 44 along the tracks 46. The shuttle 32 is about twenty three feet long. A first sheave 34 is fixedly located adjacent the near side of the fuel transfer tube 10. A second sheave 35 is affixed to the shuttle 32 at a location toward the near end of the shuttle 32 while a third sheave 36 is affixed to the shuttle 32 at a location adjacent the far end of the shuttle 32. A continuous cable 22 passes serially over the first sheave 34, the second sheave 35 and the third sheave 36 and is thereafter affixed to the fuel transfer carriage 26 at a location 56 on the near end of the fuel transfer carriage 26. In order to conveniently transmit the cable and its forces to an upper location, a fourth sheave 38 is fixedly located remote from the fuel transfer tube on the driven side with the cable passing over this fourth sheave after affixation to the fuel transfer carriage at point 56. A fifth sheave 39 is fixedly positioned at a location outwardly of the first sheave 34 with the cable passing over this sheave prior to its passage over the first, second, and third sheaves 34, 35 and 36. If desired, sheaves 40 and 42 may be located at an upper elevation to permit the drive 20 to be located with some freedom in the horizontal direction.

In order to extend the shuttle 32 and carriage 26 into and through the tube 10, the drive 20 is operated in such a direction as to move the cable 22 outwardly at the lower edge of sheave 34. This operates to move both the fuel transfer carriage 26 and the shuttle 32 into the fuel transfer tube until sheave 35 approaches the position of sheave 34. At this point the shuttle is prevented from further movement by stop 24 but the cable 22 continues to pull the fuel transfer carriage 26 until the end of the carriage 56 at which the cable 22 is attached approaches the position of sheave 36. In this manner, a horizontal translation of thirty six feet is effected, with the shuttle having a length of only twenty three feet and the fuel transfer carriage having a length of only eighteen feet.

In order to avoid unnecessary stresses and to ensure the proper location of the fuel transfer carriage 26 on full extension, stop 54 is located so as to block movement of the carriage 26 before its extreme position is reached. In addition, a remotely operated lock 52 may be operated to lock the shuttle 32 with respect to the building structure in its extended position. This locking action fixes the sheave 36 at a location well inside or through the fuel transfer tube 10. Multiple fuel transfers may then be conveniently made by driving the fuel transfer carriage 26 back and fourth between the reactor pool and the spent fuel pool as required. Thus the position of cable attachment 56 on the fuel transfer carriage 26 travels back and forth between sheaves 36 and 38. It is not required that the shuttle 32 be locked in this location although such locking of the shuttle has the advantages of reducing its total travel during operation thereby reducing wear and design life requirements.

A selectively operable latch 48 is also provided to selectively lock the fuel transfer carriage 26 and the shuttle 32 together. When the shuttle 32 is locked in its extended position by shuttle latch 52 as previously described, latch 48 is unlocked to permit passage of the fuel transfer carriage 26 past the shuttle 32 as it translates between the near and far sides. When the entire mechanism is to be withdrawn from the transfer tube 10, latch 52 is released and latch 48 is actuated to couple the fuel transfer carriage 26 and the shuttle 32. In this manner both the shuttle 32 and the fuel transfer carriage 26 are simultaneously and completely withdrawn from the fuel transfer tube 10 by operation of the drive 20 on cable 22.

Accordingly, the fuel transfer device described above provides a fuel transfer carriage 26 and a shuttle 32, both of which are driven in and out of position by the same drive mechanism 20. This arrangement eliminates the need for two drive systems for individually driving the fuel transfer carriage 26 and the shuttle 20 independently.

What is claimed is:

1. A telescoping nuclear fuel transfer system for transferring fuel bundles from the near side to the far side of a barrier, said transfer system comprising:
    a. a first path extending from the near side to the far side of the barrier;
    b. an elongated fuel transfer carriage translatable in the direction of its longitudinal axis along said first path from said near side to said far side, said carriage having near and far ends corresponding to the near and far sides of the barrier and said carriage having means for receiving fuel assemblies and for carrying the fuel assemblies in a position substantially parallel to the direction of said carriage's longitudinal axis;
    c. a second path substantially parallel to said first path;
    d. an elongated shuttle translatable along said second path in the direction of said carriage's longitudinal axis, said shuttle having near and far ends corresponding to the near and far sides of the barrier;
    e. a first sheave fixedly located at the near side of the barrier;
    f. a second sheave secured to said near end of said shuttle;
    g. a third sheave secured to said far end of said shuttle;
    h. a drive cable serially passing over said first, second, and third sheaves, in that order, and thereafter being affixed to said near end of said fuel transfer carriage; and
    i. means operating on said cable for driving said cable.

2. The fuel transfer machine as claimed in claim 1 further including releasable means for releasably locking said carriage and said shuttle together.

3. The fuel transfer machine as recited in claim 1 further including means for fixedly locking said shuttle in an extended position, said extended position being that position in which said shuttle is closest to said far side of the barrier.

4. The fuel transfer machine as recited in claim 1 wherein said cable comprises a continuous loop passing over said first, second, and third sheaves, and thereafter being affixed to said fuel transfer carriage and returning to said means for driving said cable.

5. The telescoping fuel transfer system as recited in claim 1 wherein said first path extends through an opening in the barrier and wherein said second path extends at least partially into the opening in the barrier thereby permitting said shuttle to be driven at least part way into the opening in the barrier.

6. In a fuel transfer system adapted to transfer nuclear fuel from the near side to the far side of a barrier, the fuel transfer system including a first path extending from the near side to the far side of the barrier, a fuel transfer carriage translatable along the first path for carrying nuclear fuel, a second path substantially parallel to the first path, an elongated shuttle translatable along the second path, means operating on the shuttle and between the shuttle and the fuel transfer carriage for driving the fuel transfer carriage and the shuttle back and forth along the first and second paths respectively, the method of transferring the fuel from the near side to the far side of the barrier comprising the steps of:
   a. coupling said fuel transfer carriage to said shuttle;
   b. driving the shuttle in a forward direction along the second path from a first shuttle position on the near side of the barrier to the second shuttle position in which one end of the shuttle remains on the near side of the barrier and the other end of the shuttle projects at least partially into an opening in the barrier or all the way through the barrier whereby the fuel transfer carriage is translated from a first carriage position to a position intermediate the first carriage position and a second carriage position;
   c. uncoupling the fuel transfer carriage from the shuttle;
   d. driving the fuel transfer carriage in a forward direction along the first path from said intermediate carriage position to the second carriage position in which at least one end of the nuclear fuel projects through the opening in the barrier to the far side of the barrier, said step of driving the nuclear fuel transfer carriage being accomplished by means working between the fuel transfer carriage and the shuttle; and
   e. driving the fuel transfer carriage from its intermediate position to the second carriage position.

7. The fuel transfer method as recited in claim 6 further including the steps of:
   a. locking the shuttle in the second shuttle position;
   b. repetitively driving the fuel transfer carriage back and forth between the first and second carriage positions from the shuttle in its locked position at the second position to accomplish repetitive fuel transfers.

8. The fuel transfer method as recited in claim 7 wherein the step of driving the fuel transfer carriage and the shuttle in a reverse direction to return all apparatus to the near side of the barrier when the fuel transfer operation has been completed includes the steps of:
   a. driving the fuel transfer carriage from the second carriage position to a position adjacent the locked shuttle in its second shuttle position;
   b. coupling the fuel transfer carriage to the shuttle;
   c. unlocking the shuttle from the second shuttle position; and
   d. driving the shuttle from the second shuttle position to the first shuttle position whereby the fuel transfer carriage is translated from the position adjacent the second shuttle position to the first carriage position.

* * * * *